Dec. 12, 1950   H. G. LEMOINE   2,534,039
MACHINE FOR MANUFACTURING TWISTED CORE CHENILLE
Filed Sept. 17, 1948   3 Sheets-Sheet 1

Dec. 12, 1950   H. G. LEMOINE   2,534,039
MACHINE FOR MANUFACTURING TWISTED CORE CHENILLE
Filed Sept. 17, 1948   3 Sheets-Sheet 2

Dec. 12, 1950     H. G. LEMOINE     2,534,039
MACHINE FOR MANUFACTURING TWISTED CORE CHENILLE
Filed Sept. 17, 1948     3 Sheets-Sheet 3

UNITED STATES PATENT OFFICE 2,534,039

MACHINE FOR MANUFACTURING TWISTED CORE CHENILLE

Henri Guido Lemoine, Talence, France

Application September 17, 1948, Serial No. 49,739
In France September 26, 1947

5 Claims. (Cl. 57—24)

The invention relates to machines for manufacturing twisted core chenilles, wherein the driving of the core threads is effected by means of endless drive wires, threads, belts or ribbons, suitably guided and having a continous motion imparted thereto.

The object of the invention is to provide certain improvements in this type of machine in order to obtain from it a more reliable operation and also make the machine capable of manufacturing chenilles of very varied sizes, especially very fine chenilles.

These improvements consist essentially of means for controlling directly the advancing motion of the driving threads by the rotary motion common to a system of the spools of core threads and the supporting and guiding mechanism of the drive threads and for ensuring a desired revolution of the spools of trimming threads by a circular friction drive in such a way that, due to the sliding thus made possible, any accidental breaking of the latter threads is avoided, an incident which has unfortunately been frequent during the manufacture of small size chenilles.

Due to the continuous guiding of the core threads of any length provided by the drive threads, it is, as a result possible to use core threads of a very small diameter and of textile material, which will allow the manufacture of very fine chenilles capable of being worked and woven like textile threads.

To this effect the machine comprises a first rotary system, adequately driven carrying at the same time the spools of core threads and the supporting and driving mechanism for the drive threads and a second rotary system, driven with the rotation of the first system, but whose elements carrying the spools of trimming threads roll freely on an outer friction crown so as to assume a planetary revolving motion about a central rotation axis.

The appended drawings show, by way of example, one form of embodiment of the improved chenille making machine which fulfills the objects of the invention.

Figure 1 of said drawings is a vertical longitudinal section of the machine thus embodying the invention.

Figure 1:
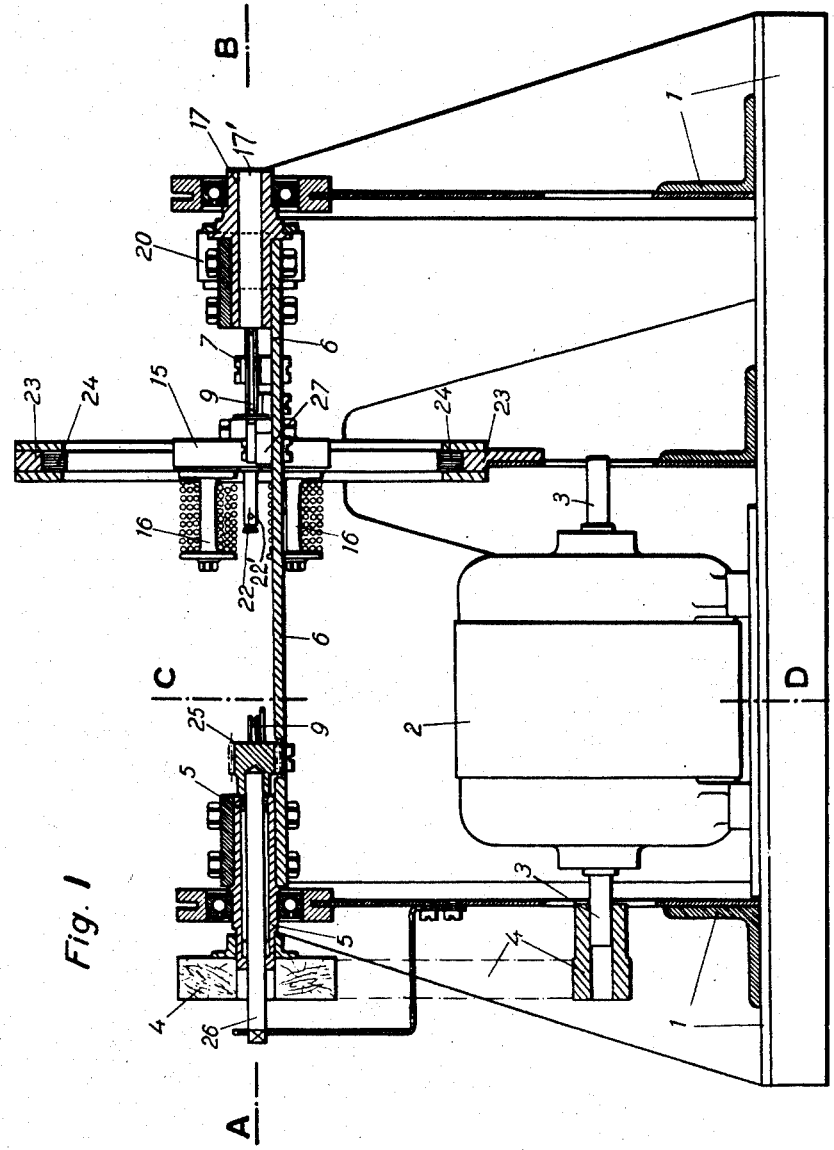
Figure 2:
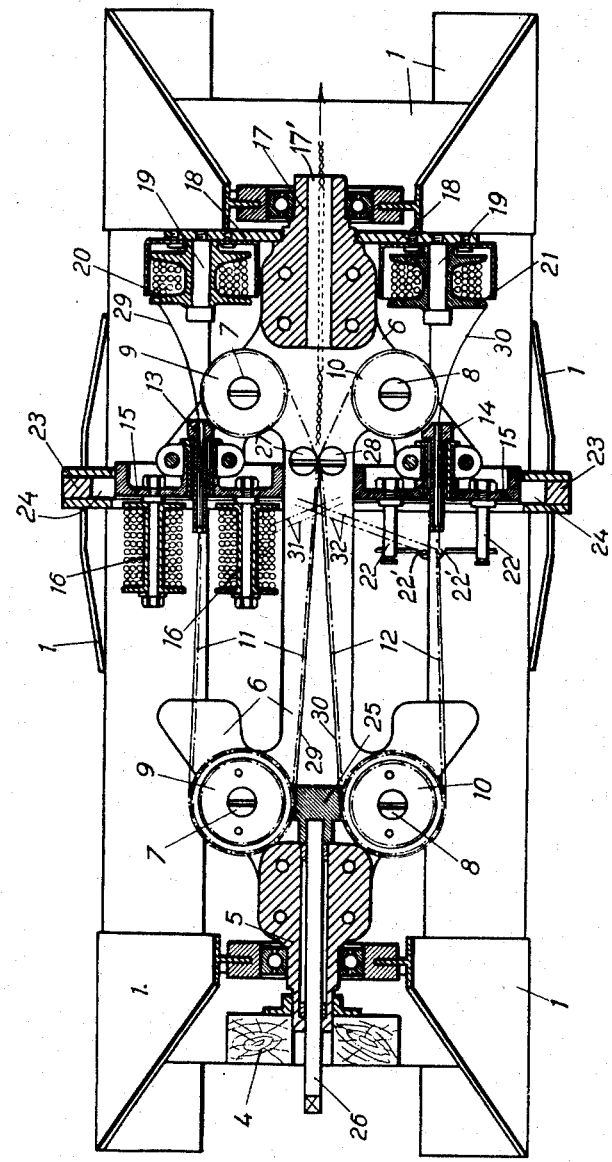
Figure 2 is the horizontal section thereof, along line 2—2 of Figure 1.
Figure 3:
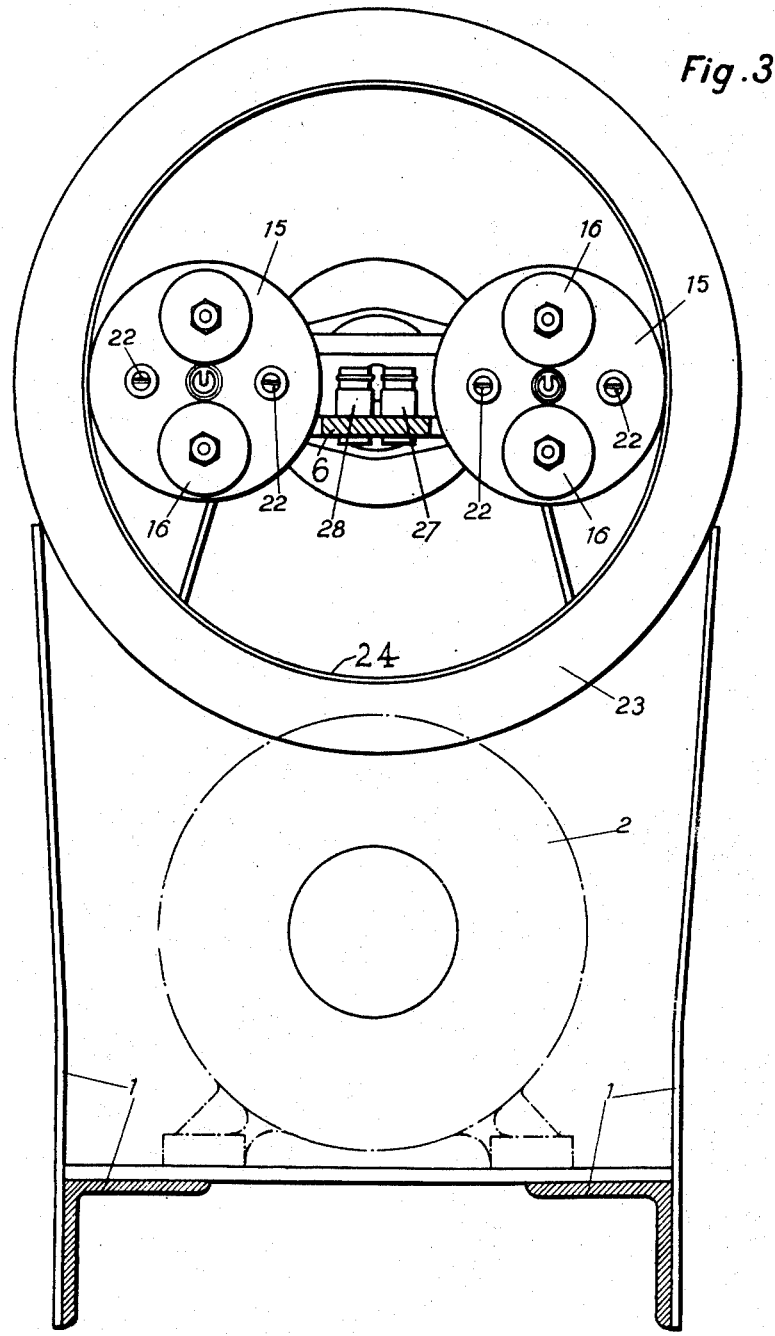
Figure 3 is the transverse section thereof, made along line 3—3 of Figure 1.

As can be seen from these drawings, the machine comprises a framework 1, carrying the electric control motor 2, the shaft 3 of the latter driving, through a suitable transmission 4, an upper hollow shaft 5 whereon is attached by any suitable means a plate 6. On this plate 6 are attached, on one hand the shafts 7 and 8 of pulleys 9 and 10, over which the two endless drive belts or threads 11 and 12 pass and, on the other hand, the hollow guides 13 and 14 for these threads, which act as axial guides for rotatable planetary discs 15 carrying the rotary spools 16 of the trimming threads.

This same plate 6 carries at its end a hollow shaft 17 and two radial arms 18 to which are attached the two shafts 19 of the spools 20 and 21 for the two core threads. The discs 15 supporting the spools 16 for the trimming threads also carry the supporting arms 22 of the guides 22 for these threads.

Around the planetary discs 15 is arranged a stationary orbit ring 23 attached to the framework 1 and carrying an internal circular friction packing 24, which may, for instance be made of rubber or of any other similar material, to form an annular track upon which these discs roll during their rotation.

The rotation of the pulleys 9 and 10 serves to positively move the drive wires or belts 11 and 12, the pulleys being driven by means of a gear 25 provided with helicoidal teeth and carried by stationary shaft 26 attached to the framework 1, and about which the hollow shaft 5 rotates, the teeth of this gear meshing with corresponding teeth on pulleys 9 and 10.

The endless drive threads or belts 11 and 12 are brought back to the longitudinal axis of the machine by passing them over guiding rollers 27 and 28 which place them sufficiently close to each other to engage on both sides of the core threads and ensure the driving of the core threads thus engaged between them.

It will be realized that the starting of the electric motor 2 causes the rotation of the hollow shaft 5 to occur with simultaneous rotation of plate 6 and thereby the rotation of hollow shaft 17 about its axis. This rotation of plate 6 effects the driving of pulleys 9 and 10 through gear 25 and consequently, the continuous advance motion of the drive threads or belts 11 and 12 passing over said pulleys. The rotation of plate 6 also causes the simultaneous rolling of the discs 15 upon the friction packing 24 and, due to this fact, the planetary revolution of the spools of trimming threads 16 about the central axis. At the same time, the rotation of plate 6, through the hollow shaft 17 and the arms 18 causes simultaneous rotation of the core thread spools 20 also about the same axis.

The two core threads 29 and 30 which unwind respectively from the spools 20 and 21 are engaged in the guides 13 and 14 for the drive threads, then led along the latter to become engaged between the guiding rollers 27 and 28. It will be realized that the rotation of plate 6 thus causes the twisting of these two core threads, the twisting being drawn rectilinearly, without any rotation through the end hollow shaft 17, but previously to this twisting of the core threads 29 and 30 the trimming threads 31 and 32 which unwind from the spools 16 have been engaged between these core threads and caught and tied in the twist while being made and thus driven with it.

A knife, suitably arranged at the outlet of the guides 27—28 then cuts the tufts of trimming threads caught in the twist so as to finish the chenille.

A winding device (not shown) for the manufactured chenille, arranged at the outlet or delivery end 17' of the hollow shaft 17 ensures the positive movement and advancement of the chenille and its reception in any length.

Owing to the continuous guiding of the core threads 29 ad 30 by the drive threads 11 and 12, these core threads can be very fine and of textile material without any risk of breaking. Further, the control for the unwinding of the spools of trimming threads 16 being effected by friction, this feature also follows the use of trimming threads of very small size without any risk of breaking. It will be understood, in this manner, that the machine designed in accordance with the invention will allow the manufacture of very thin chenilles which can be utilized for very varied uses and especially can be woven in the same manner as ordinary textile threads.

It is obvious that the details of embodiment described and represented here have been given only by way of examples of embodiment which do not limit the invention, inasmuch as the latter is capable of any number of modifications.

What I claim is:

1. A machine for manufacturing twisted core chenilles, including a support; a first system of core thread spools rotatably mounted on the support; a second system of trimming thread spools also rotatably mounted on said support; drive means for simultaneously rotating both systems; means for imparting planetary rotation to the trimming thread spools simultaneously with the rotation of the second system involving the latter spools; two endless drive belts; a plurality of pulleys rotatably mounted for rotation with both systems and spaced apart in effective positions to movably support the drive belts independently of each other but in such manner that a limited length of one belt extends substantially co-extensively with a corresponding limited length of the other belt; means for simultaneously driving the two endless drive belts in such manner that the co-extensive lengths thereof travel in the same general direction; means for guiding the core threads from the core thread spools between the co-extensive lengths of said endless drive belts in effective position to cause simultaneous entwining of the trimming threads from the trimming thread spools with said core threads; and operable guide means accompanying said two systems in rotation and guiding the intermediate portions of said co-extensive lengths of said endless drive belts together in effective relation to feed the trimmed core threads through the machine and simultaneously twist said threads by the effect of the rotation of the two spool systems.

2. A machine for manufacturing twisted core chenilles, including a support; a plate mounted for rotation on the support; means for driving the plate; a plurality of pulleys rotatably mounted on said plate and spaced apart into corresponding pairs; two endless belts mounted on the pulleys with a limited length of one belt substantially co-extensive with a corresponding limited length of the other belt; means operable by the rotation of said plate effective to cause rotation of at least two of said pulleys and thereby drive the endless belts so that the co-extensive lengths thereof travel in the same general direction; a group comprising at least two core thread spools mounted on said plate to rotate therewith; a pair of distinct thread guides upon said plate disposed in spaced apart relation, with each guide serving to guide one of the endless belts and the core thread from one of the two core thread spools in mutual association; a plurality of at least two trimming thread spools mounted on said plate for planetary rotation as a group about an axis parallel to, and spaced a predetermined distance from, the axis of rotation of said plate; means for imparting planetary rotation to the trimming thread spools during the rotation of said plate; and two guiding rollers rotatably mounted in mutually adjacent positions upon said plate at either side of the co-extensive lengths of said endless belts and intermediate said pulleys in effective positions to bring corresponding portions of said co-extensive lengths together and to cause simultaneous entwining of the trimming threads with the core threads and subsequent engagement of the entwined threads between said endless belts as the latter pass between said guiding rollers and likewise cause twisting of the core threads thus trimmed by the effect of the rotation of the core thread and trimming thread spools.

3. A machine for manufacturing twisted core chenilles, including a support; a hollow shaft mounted for rotation on said support; a plate secured on the hollow shaft and rotating therewith; drive means for rotating said hollow shaft and said plate; two pairs of pulleys spaced apart and rotatably mounted on the plate symmetrically at both sides of the axis of rotation of said hollow shaft and plate; two symmetrical endless belts mounted on the pulleys with a limited length of one belt substantially co-extensive with and adjacent to a corresponding limited length of the other belt; a stationary gear supported on said support co-axially with said axis of rotation of said hollow shaft; a pinion rigid with one pulley of each pair of said spools and meshing with said stationary gear so that rotation of said hollow shaft and plate will cause rotation of the pinions and both pairs of pulleys and simultaneous travel of said endless belts over the latter; a plurality of core thread spools forming a first group mounted on said plate to rotate therewith; a plurality of hollow thread guides mounted on said plate in effective positions to direct one of the endless belts and one of said core threads through each hollow thread guide from one pulley to the other in each pair; a plurality of trimming thread spools forming a second group mounted for planetary rotation as a group upon at least one of said hollow thread guides; means for imparting planetary rotation to said second group when said plate is rotated; and two guiding rollers rotatably mounted in mutually adjacent positions upon said plate at either side of the co-extensive lengths of said endless belts and intermediate said pulleys in effective positions to bring corresponding portions of said co-extensive lengths together and cause simultaneous entwining of the trimming threads with the core threads and subsequent engagement of the entwined threads between said endless belts as the latter pass between said guiding rollers and likewise cause twisting of the core threads thus trimmed by the effect of the rotation of the core thread and trimming thread spools.

4. A machine for manufacuring twisted core chenilles, including a support; a plate mounted for rotation on the support; means for driving the plate; a plurality of pulleys rotatably mounted on said plate and spaced apart into corresponding pairs; two endless belts mounted on the pulleys with a limited length of one belt substantially co-extensive with a corresponding limited length of the other belt; means operable by the rotation of said plate effective to cause rotation of at least two of said pulleys and thereby drive the endless belts so that the co-extensive lengths thereof travel in the same general direction; a group comprising at least two core spools mounted on said plate to rotate therewith; a pair of distinct thread guides upon said plate disposed in spaced apart relation, with each guide serving to guide one of the endless belts and the core thread from one of the two core thread spools in mutual association; a plurality of at least two trimming thread spools mounted on said plate for planetary rotation as a group about an axis parallel to, and spaced a predetermined distance from, the axis of rotation of said plate; a stationary annular orbit ring upon said support encircling the plate and portions of the trimming thread spools; annular friction means disposed upon said orbit ring and corresponding traction means on said trimming thread spools frictionally engaging therewith and imparting planetary rotation to the trimming thread spools during the rotation of said plate; and two guiding rollers rotatably mounted in mutually adjacent positions upon said plate at either side of the co-extensive lengths of said endless belts and intermediate said pulleys in effective positions to bring corresponding portions of said co-extensive lengths together and cause simultaneous entwining of the trimming threads with the core threads and subsequent engagement of the entwined threads between said endless belts as the latter pass between said guiding rollers and likewise cause twisting of the core threads thus trimmed by the effect of the rotation of the core thread and trimming thread spools.

5. A machine for manufacturing twisted core chenilles, including a support; a plate mounted for rotation on the support; means for driving the plate; a plurality of pulleys rotatably mounted on said plate and spaced apart into corresponding pairs; two endless belts mounted on the pulleys with a limited length of one belt substantially co-extensive with a corresponding limited length of the other belt; means operable by the rotation of said plate effective to cause rotation of at least two of said pulleys and thereby drive the endless belts so that the co-extensive lengths thereof travel in the same general direction; a group comprising at least two core spools mounted on said plate to rotate therewith; a plurality of hollow thread guides mounted on said plate in effective positions to direct one of the endless belts and one of said core threads through each hollow thread guide from one pulley to the other in each pair; a plurality of trimming thread spools forming a second group mounted for planetary rotation as a group upon one of said thread guides; further thread guides rotatably mounted on the other of said hollow thread guides; means for imparting planetary rotation to the trimming thread spools and the further thread guides during rotation of said plate; and two guiding rollers rotatably mounted in mutually adjacent positions upon said plate at either side of the co-extensive lengths of said endless belts and intermediate said pulleys in effective positions to bring corresponding portions of said co-extensive lengths together and cause simultaneous entwining of the trimming threads with the core threads and subsequent engagement of the entwined threads between said endless belts as the latter pass between said guiding rollers and likewise cause twisting of the core threads thus trimmed by the effect of the rotation of the core thread and trimming thread spools.

HENRI GUIDO LEMOINE.

No references cited.